United States Patent
Watanabe (10) Patent No.: US 8,648,949 B2
(45) Date of Patent: Feb. 11, 2014

(54) SOLID-STATE IMAGING APPARATUS AND DRIVING METHOD, IN WHICH PSEUDOSIGNALS FROM AN AMPLIFIER ARE SUPPRESSED, AND IN WHICH FIXED PATTERN NOISES AND SHADING ARE REDUCED

(75) Inventor: Takanori Watanabe, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/365,745

(22) Filed: Feb. 3, 2012

(65) Prior Publication Data

US 2012/0133812 A1    May 31, 2012

Related U.S. Application Data

(62) Division of application No. 12/354,374, filed on Jan. 15, 2009, now Pat. No. 8,115,847.

(30) Foreign Application Priority Data

Feb. 15, 2008   (JP) ................................. 2008-035222

(51) Int. Cl.
*H04N 5/335* (2011.01)
*H01L 33/00* (2010.01)

(52) U.S. Cl.
USPC ........................................ 348/308; 250/208.1

(58) Field of Classification Search
None
See application file for complete search history.

(56) References Cited

U.S. PATENT DOCUMENTS

| | | | |
|---|---|---|---|
| 6,043,478 A | 3/2000 | Wang | |
| 6,320,616 B1 | 11/2001 | Sauer | |
| 6,731,337 B2 | 5/2004 | Watanabe | |
| 7,456,880 B2 | 11/2008 | Okita et al. | |
| 7,514,732 B2 | 4/2009 | Okita et al. | |
| 7,542,085 B2 * | 6/2009 | Altice et al. | 348/296 |
| 7,969,494 B2 * | 6/2011 | Ladd et al. | 348/308 |
| 8,115,847 B2 * | 2/2012 | Watanabe | 348/308 |
| 2003/0025816 A1 | 2/2003 | Sakuragi | |
| 2005/0205902 A1 | 9/2005 | Hara et al. | |
| 2006/0001751 A1 | 1/2006 | Abe et al. | |
| 2006/0061674 A1 | 3/2006 | Iida et al. | |
| 2006/0175536 A1 | 8/2006 | Kim et al. | |
| 2006/0175538 A1 * | 8/2006 | Kim et al. | 250/208.1 |
| 2006/0256221 A1 * | 11/2006 | Mckee et al. | 348/308 |

(Continued)

FOREIGN PATENT DOCUMENTS

JP    2003-032554 A    1/2003
JP    2005-198001 A    7/2005

(Continued)

*Primary Examiner* — Luong T Nguyen

(74) *Attorney, Agent, or Firm* — Fitzpatrick, Cella, Harper & Scinto (57) ABSTRACT

A solid state imaging apparatus of less fixed pattern noises and less shading comprises an imaging area wherein a plurality of pixel circuits are arranged in two dimensionally, and each of the pixel circuits includes a plurality of photoelectric conversion elements each for generating an electric charge by a photoelectric conversion and for accumulating the electric charge, a single floating diffusion portion for accumulating the charge, a plurality of transfer switches for transferring the electric charges respectively from the plurality of photoelectric conversion elements to the single floating diffusion portion and an amplifying transistor for amplifying a voltage corresponding to the electric charge accumulated by the floating diffusion portion, wherein the plurality of transfer switches transfers the electric charges from the plurality of photoelectric conversion elements sequentially to the floating diffusion portion while maintaining the amplifying transistors at the activation state.

7 Claims, 7 Drawing Sheets

(56) References Cited

U.S. PATENT DOCUMENTS

| | | |
|---|---|---|
| 2008/0029787 A1 | 2/2008 | Watanabe et al. |
| 2008/0029793 A1 | 2/2008 | Watanabe et al. |
| 2008/0303930 A1 | 12/2008 | Kuroda et al. |
| 2009/0015699 A1 | 1/2009 | Watanabe et al. |
| 2009/0053848 A1* | 2/2009 | Fan ............................ 348/308 |
| 2009/0159945 A1 | 6/2009 | Okita et al. |
| 2009/0256230 A1 | 10/2009 | Watanabe |
| 2009/0303365 A1 | 12/2009 | Watanabe |

FOREIGN PATENT DOCUMENTS

| | | |
|---|---|---|
| JP | 2005-268537 A | 9/2005 |
| JP | 2008-500768 A | 1/2008 |
| WO | 2005/120048 A1 | 12/2005 |

* cited by examiner

SOLID-STATE IMAGING APPARATUS AND DRIVING METHOD, IN WHICH PSEUDOSIGNALS FROM AN AMPLIFIER ARE SUPPRESSED, AND IN WHICH FIXED PATTERN NOISES AND SHADING ARE REDUCED

This is a division of U.S. patent application Ser. No. 12/354,374, filed Jan. 15, 2009.

BACKGROUND OF THE INVENTION

1. Field of the Invention

The present invention relates to a solid-state imaging apparatus and a driving method thereof.

2. Description of the Related Art

In recent years, a solid-state imaging apparatus has been widely used for a moving image, a still image, and other various imaging uses. In particular, the improvement of the performances of a complementary metal oxide semiconductor (CMOS) sensor, which includes an amplifying metal oxide semiconductor (MOS) transistor in each pixel and can mount peripheral circuitry on a chip is remarkable, and the improvement of the image quality of the CMOS sensor knows no boundaries. In order to further improve the image quality of the CMOS sensor, it is an important problem to reduce the random noises and fixed noises that arise in the amplifying MOS transistors in the pixels.

The technique of reducing reset noises of each amplifying MOS transistor by means of a correlated double sampling technique has been widely used. The correlated double sampling is described below. The technique obtains the difference between an output of each amplifying MOS transistor in the state in which the input portion thereof is reset (hereinafter referred to as a reset output) and an output of the amplifying MOS transistor in the state in which signal charges of a photoelectric conversion element are transferred to the input portion of the amplifying MOS transistor (hereinafter referred to a signal output). This technique of reading the signal charge quantity of a photoelectric conversion element in low noise is the correlated double sampling. By the use of this technique, the image quality of the CMOS sensor has been remarkably improved.

Moreover, the progress of the technique of the solid-state imaging apparatus aims the miniaturization of optical sizes and the increment of the number of pixels, and the pixel pitches keep on decreasing. Consequently, it is also an important object to maintain the signal charge quantity of a photoelectric conversion element even if the pixel pitches are decreased.

As a measure of achieving this object, the technique of securing the area of a photoelectric conversion element by a pixel sharing technique has been used. The pixel sharing technique is the technique of sharing the inter pixel circuits, such as an amplifying MOS transistor and a reset MOS transistor, with a plurality of photoelectric conversion element to reduce the number of elements per photoelectric conversion element. A configuration of a pixel circuit using the pixel sharing technique and a driving method thereof are disclosed in Japanese Patent Application Laid-Open No. 2005-198001.

On the other hand, 1/f noises are also known as an important factor of the noises arising in an amplifying MOS transistor. Various researches have been made with regard to the 1/f noises of a MOS transistor, and Japanese Patent Application Laid-Open No. 2003-032554 describes especially with regard to the behavior of the 1/f noises in a solid-state imaging apparatus.

The phenomenon described in Japanese Patent Application Laid-Open No. 2003-032554 can be considered as follows. According to the study of the inventor of the present invention, the influences of a variation of a bias in the output of a transistor remain for a relatively long time, of the degree of 100 ms, when the variation has arisen in the bias of the transistor. Furthermore, as a result of the research of the present inventor based on this concept, it was found that the output value of an amplifying MOS transistor minutely varied with a very long time constant in comparison with the time constant of the equivalent circuit of the amplifying MOS transistor after the gate potential thereof had greatly varied.

If the correlated double sampling is performed in a time period during which the output value of an amplifying MOS transistor is minutely varying, then the minute variation component is superimposed on a normal signal as a pseudo signal. If the amplitude of the pseudo signal disperses every pixel, the dispersion becomes a fixed pattern, and if the amplitude has a tendency in an imaging plane, the tendency becomes shading. These variations become factors of degradation of an image quality.

SUMMARY OF THE INVENTION

The present invention is directed to provide a solid-state imaging apparatus suppressing the occurrence of a pseudo signal originated from an amplifying transistor and having less fixed pattern noises and shading, and to provide a method of driving the solid-state imaging apparatus.

The solid state imaging apparatus of the present invention comprises: an imaging area wherein a plurality of pixel circuits are arranged two dimensionally, and each of the pixel circuits includes a plurality of photoelectric conversion elements each for generating an electric charge by a photoelectric conversion and for accumulating the electric charge, a single floating diffusion portion for accumulating the charge, a plurality of transfer switches each for transferring the electric charge from one of the plurality of photoelectric conversion elements to the single floating diffusion portion and an amplifying transistor for amplifying a voltage corresponding to the electric charge accumulated in the single floating diffusion portion; a vertical scanning circuit for controlling the transfer switch; a horizontal scanning circuit for reading out the voltage amplified by the amplifying transistor; and a power source circuit for controlling a voltage supplied to the amplifying transistor to set the amplifying transistor to an activation state or a non-activation state, wherein the plurality of transfer switches transfer the electric charges from the plurality of photoelectric conversion elements sequentially to the floating diffusion portion while maintaining the amplifying transistors at the activation state, the horizontal scanning circuit sequentially reads out the voltage corresponding to the electric charges of the plurality of photoelectric conversion elements.

Moreover, the method of driving solid-state imaging apparatus of the present invention comprises: an imaging area wherein a plurality of pixel circuits are arranged two dimensionally, and each of the pixel circuits includes a plurality of photoelectric conversion elements each for generating an electric charge by a photoelectric conversion and for accumulating the electric charge, a single floating diffusion portion for accumulating the charge, a plurality of transfer switches each for transferring the electric charge from one of the plurality of photoelectric conversion elements to the single floating diffusion portion, and an amplifying transistor for amplifying a voltage corresponding to the electric charge accumulated in the single floating diffusion portion; a vertical scanning circuit for controlling the transfer switch; a horizontal scanning circuit for reading out the voltage amplified by the amplifying transistor; and a power source circuit for controlling a voltage supplied to the amplifying transistor to set the amplifying transistor to an activation state or a non-activation state, wherein the method comprises steps of: transferring, by the plurality of transfer switches, the electric charges from the plurality of photoelectric conversion elements sequentially to the floating diffusion portion while maintaining the amplifying transistors at the activation state, reading out sequentially, by the horizontal scanning circuit, the voltage corresponding to the electric charges of the plurality of photoelectric conversion elements.

By suppressing the occurrence of pseudo signals originated from an amplifying transistor, fixed pattern noises and shading can be lessened.

Further features of the present invention will become apparent from the following description of exemplary embodiments with reference to the attached drawings.

DESCRIPTION OF THE EMBODIMENTS

First Embodiment

Figure 1:
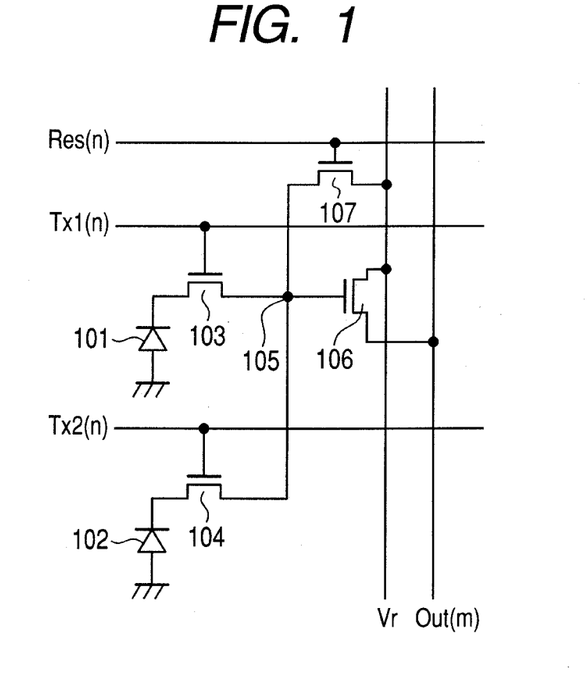
FIG. 1 is an equivalent circuit diagram of a pixel according to a first embodiment of the present invention.

FIG. 1 is an equivalent circuit diagram of a pixel according to the first embodiment of the present invention. In the following, a MOS field-effect transistor is simply referred to as a MOS transistor. The pixel includes photoelectric conversion elements 101 and 102, which are connected to a floating diffusion portion (hereinafter referred to as an FD portion) 105 through transfer switches 103 and 104, respectively. The FD portion 105 is actually a node composed of the gate capacity of an amplifying MOS transistor 106, the source capacity of a reset MOS transistor 107, the drain capacities of the transfer switches 103 and 104, and the parasitic capacitance of the wiring mutually connecting the aforesaid capacities. The gates of the transfer switches 103 and 104 are controlled by signals Tx1(n) and Tx2(n), respectively. The gate of the reset MOS transistor 107 is controlled by a signal Res(n). Here n indicates an address of the row of the pixel. The drain of the amplifying MOS transistor 106 and the drain of the reset MOS transistor 107 are connected to a power source voltage Vr. The power source voltage Vr is a variable source voltage, and can provide different electric potentials at different point of time. The source of the amplifying MOS transistor 106 is connected to a vertical signal line Out(m). Here m indicates the address of the column of the pixel. The vertical signal line Out(m) is provided with a not shown sampling and holding circuit, and a signal output to the vertical signal line Out(m) can be held. A power source circuit controls the power source voltage Vr.

Figure 2:
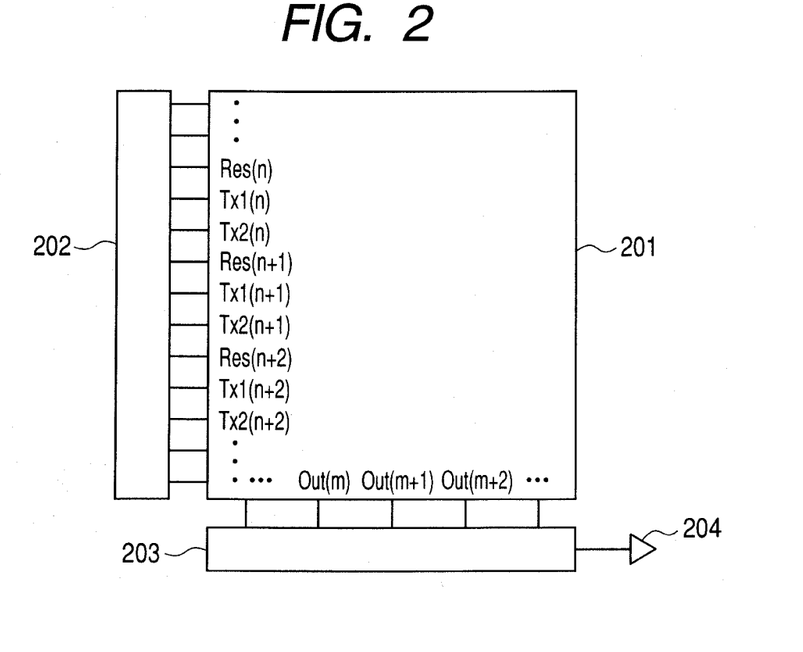
FIG. 2 is a block diagram of a solid-state imaging apparatus according to the first embodiment of the present invention.

FIG. 1 illustrates the unit cell, in which the two photoelectric conversion elements 101 and 102 share a pixel circuit, and an imaging region can be constituted by arranging the unit cells in two dimensions. FIG. 2 is a block diagram of a solid-state imaging apparatus according to the first embodiment of the present invention, and the solid-state imaging apparatus includes an imaging region 201, a vertical scanning circuit 202, and a horizontal scanning circuit 203. The horizontal scanning circuit 203 sequentially selects signals held in the sampling and holding circuit to transfer the signals to an output 204, which is an output portion.

The correlated double sampling obtains a difference between an output in the state of resetting the input portion of the amplifying MOS transistor 106 (hereinafter referred to as a reset output) and an output in the state of transferring the signal charges of the photoelectric conversion element 101 or 102 to the input portion of the amplifying MOS transistor 106 (hereinafter referred to as a signal output). The signal output includes a charge quantity equal to the reset output in addition to the signal quantity obtained by photoelectric conversion. Accordingly, the technique of reading the signal charge quantity of the photoelectric conversion element 101 or 102 with low noises by calculating the difference between the reset output and the signal output is the correlated double sampling. The case where the reset output and the signal output are held by the not shown sampling and holding circuit is exemplified to be described.

Figure 3:
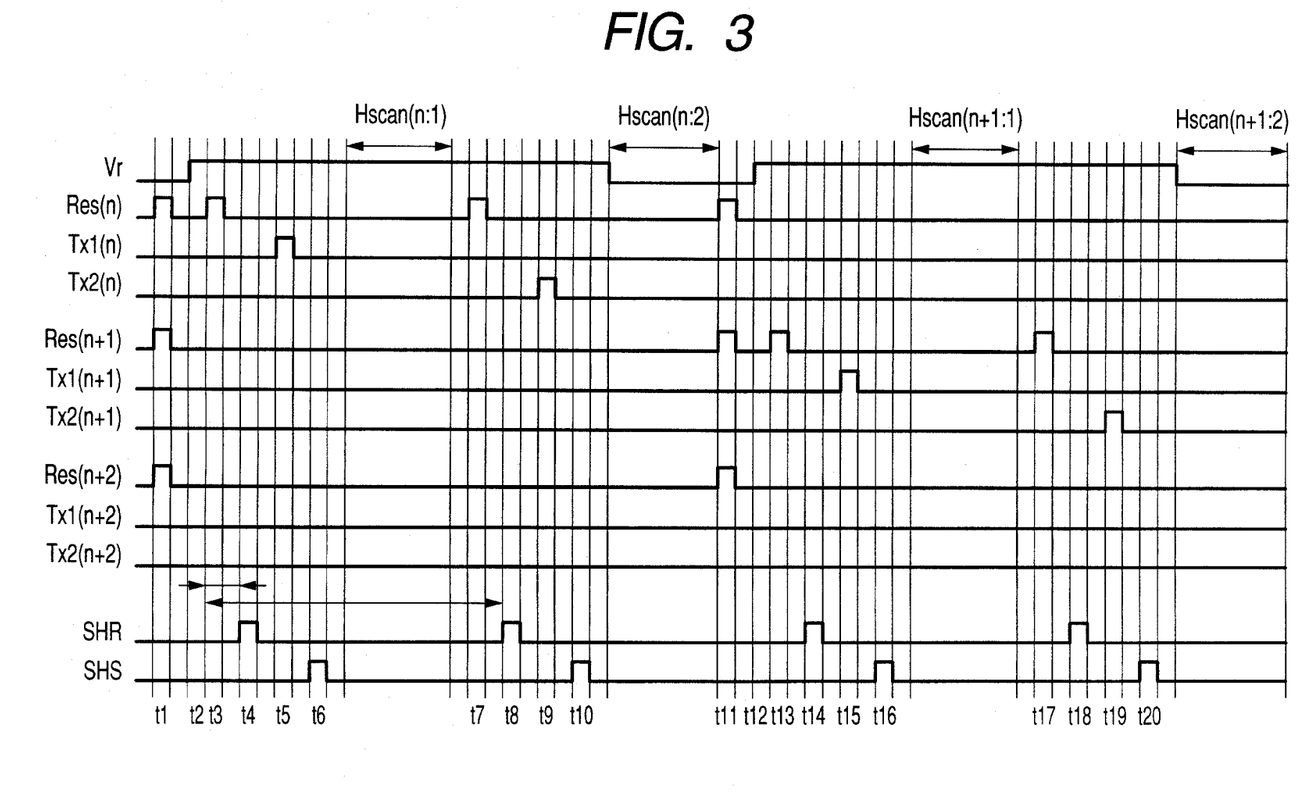
FIG. 3 is a timing diagram illustrating a method of driving a solid-state imaging apparatus according to the first embodiment of the present invention.

FIG. 3 is a timing diagram illustrating a method of driving a solid-state imaging apparatus according to the first embodiment of the present invention. At time t1, the signals Res(n), Res(n+1), Res(n+2), . . . become the high level, and the reset MOS transistors 107 in each row are turned on. At this time, the power source voltage Vr is the low level, and each FD portion 105 is reset to the low potential. That is, each FD portion 105 becomes the non-activation state. At time t2, the power source voltage Vr is changed to the high level, and at time t3, the reset MOS transistors 107 in only the selected row are turned on by the signal Res(n). That is, the reset MOS transistors 107 turn to their activation states. By the drive up to now, only the FD portions 105 in the selected row become high potential, and the potential of the vertical signal lines Out(m), Out(m+1), Out(m+2), . . . is determined by the amplifying MOS transistors 106 in the selected row. In this state, only the amplifying MOS transistors 106 in the $n^{th}$ row are in the activation states, and the amplifying MOS transistors 106 in the other rows, that is, the amplifying MOS transistors 106 in the (n+1)th row, (n+2)th row, . . . are in their non-activation states. Next, at time t4, a sampling and holding pulse SHR is used for sampling and holding the reset outputs by the sampling and holding circuits. Next, at time t5, by a signal Tx1(n), the signal charges of the photoelectric conversion elements 101 are transferred to the FD portions 105, and then, at time t6, by applying a sampling and holding pulse SHS, the sampling and holding circuits perform the sampling and holding of the signal outputs. Next, in a horizontal scanning period Hscan(n: 1), a horizontal scanning is performed, and then in the operation during a time period t7-t10 in turn, the signal charges of the photoelectric conversion elements 102 addressed by a signal Tx2(n) are read out, and a horizontal scanning is performed in a horizontal scanning period Hscan (n: 2). Incidentally, the pulses of the signal Res(n) are changed to the high level at different time t1 and t3 in FIG. 3, but the readout operation can be performed even if a high level pulse is continuously given over a time period t1-t3.

By a conventional method of driving a solid-state imaging apparatus, the FD portions 105 are reset to the low potential after the horizontal scanning period Hscan(n: 1), and the amplifying MOS transistors 106 are made to the non-activation states. After that, the conventional method again resets the FD portions 105 to the high potential to activate the amplifying MOS transistors 106. The conventional solid-state imaging apparatus performs the correlated double sampling readouts for the readouts of the photoelectric conversion elements 102 during a relatively short time period, concretely for several microseconds to several tens of microseconds, and consequently the problem mentioned above occurs.

On the other hand, since the FD portions 105 are held to high potential also during the horizontal scanning period Hscan(n: 1) in the present embodiment, the readouts of the signal charges of the photoelectric conversion elements 102 are performed by the amplifying MOS transistors 106, which are in the activation state over relatively long time periods. To put it concretely, the time periods of the amplifying MOS transistors 106 from their activation to their readouts are a time period t2-t8 to the readouts of the noise outputs or a time period t2-t10 to the readouts of the signal outputs. These time periods severally include a horizontal scanning period, and consequently, for example, the time periods are severally over about 15 ms in case of a high definition (HD) moving image.

By the drive mentioned above, the first embodiment of the present invention can reduce especially the pseudo signals for the readouts of signal charge quantities transferred by the signals Tx2(n), Tx2(n+1), Tx2(n+2), . . . . Since the noise degradation degree of an imaged image depends on the sum of the noise quantity of each pixel, an image quality can be improved by reducing the pseudo signals by the present embodiment.

Second Embodiment

In the first embodiment of the present invention, after the elapse of the horizontal scanning period Hscan(n) after the readouts of the signal charge quantities transferred by the signal Tx1(n), the transfer of signal charges is performed by the signal Tx2(n). The present embodiment can obtain an advantage also in the case of performing a horizontal scanning after holding the signal charges by the signals Tx1(n) and Tx2(n) in a line memory provided in the horizontal scanning circuit 203.

Figure 4:
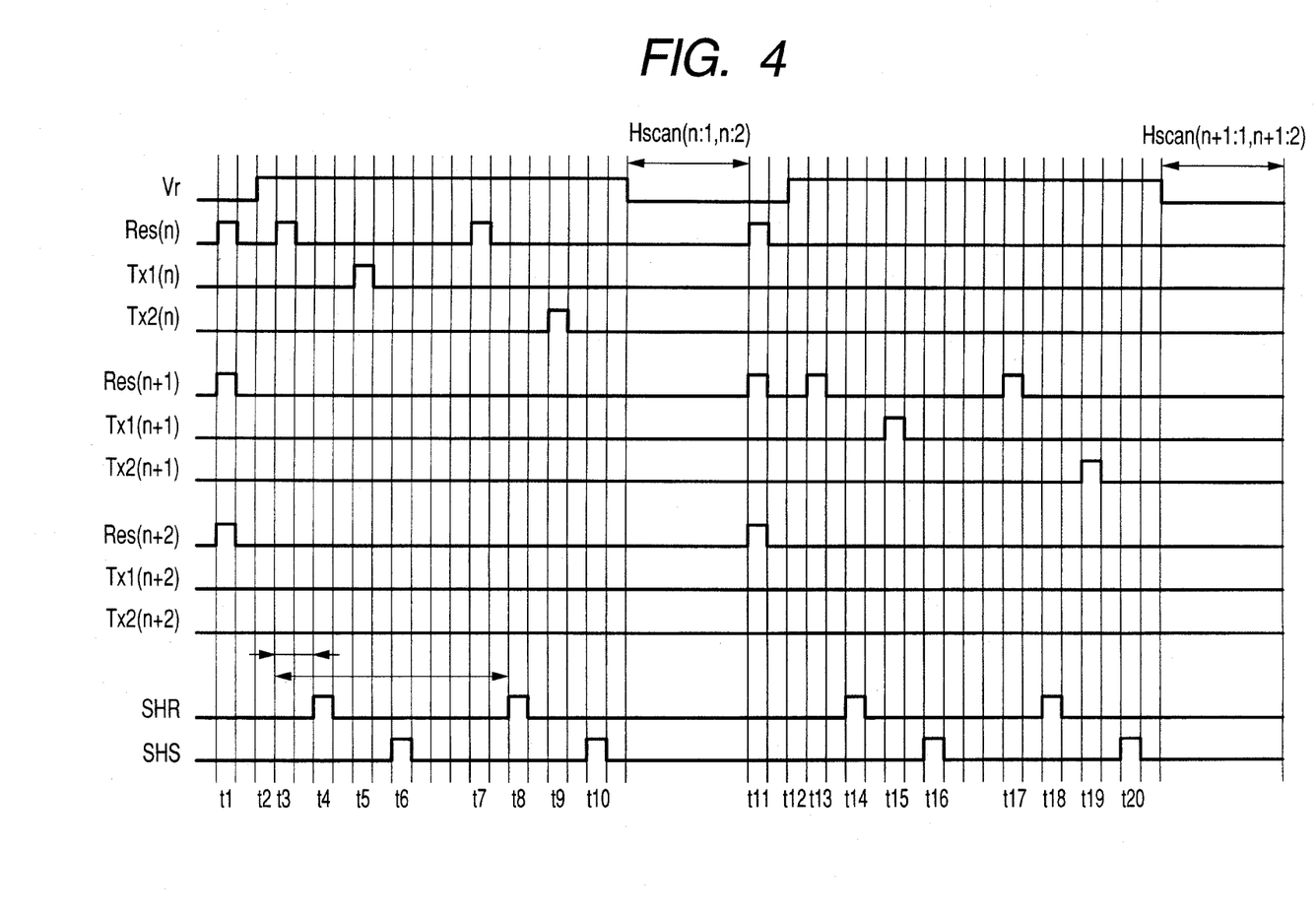
FIG. 4 is a timing diagram illustrating a method of driving a solid-state imaging apparatus according to a second embodiment of the present invention.

FIG. 4 is a timing diagram illustrating a method of driving a solid-state imaging apparatus according to the second embodiment of the present invention. The equivalent circuit of a pixel and the block diagram of the solid-state imaging apparatus are the same as those of the first embodiment. The present embodiment differs from the first embodiment in the respect of sampling and holding the signal charges transferred by the signals Tx1(n) Tx2(n) before a horizontal scanning period Hscan(n; 1, n; 2). The advantage of performing such a drive is that the number of times of the horizontal scanning periods necessary for reading one frame becomes half, and the speeding up of a readout becomes easier. The feature of the drive timing of the present embodiment is performing the correlated double sampling without setting the amplifying MOS transistors 106 to be in the non-activation states just before performing the readouts of the signal charges transferred by the signal Tx2(n). To put it concretely, the time period of the amplifying MOS transistors 106 from their activation to their readouts is a time period t2-t8 to the readouts of the noise outputs or a time period t2-t10 to the readouts of the signal outputs.

The present embodiment can achieve the speeding up of readouts while reducing the pseudo signals for the readouts of signal charge quantities transferred by the signals Tx2(n), Tx2(n+1), Tx2(n+2), . . . .

Third Embodiment

Figure 5:
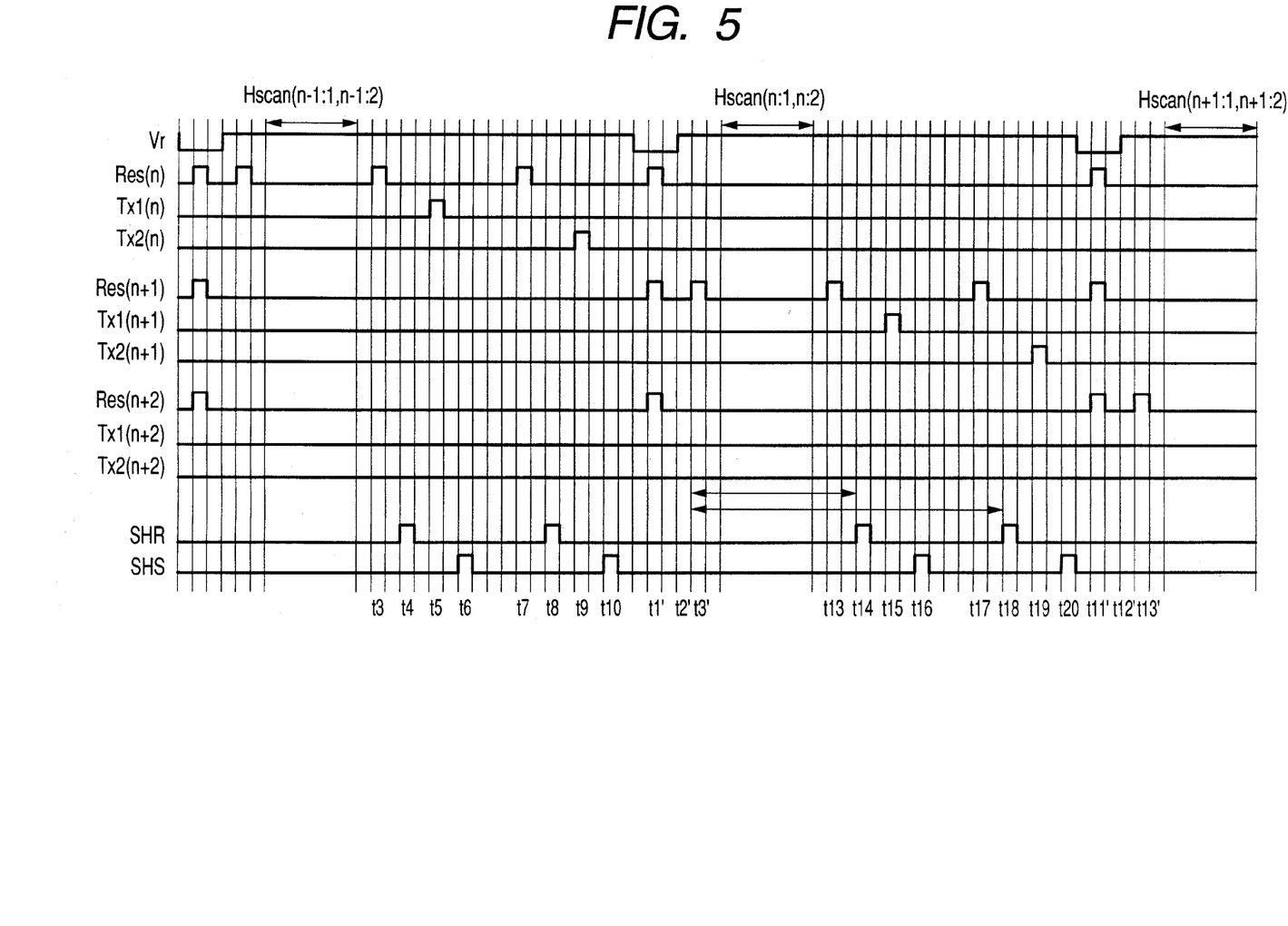
FIG. 5 is a timing diagram illustrating a method of driving a solid-state imaging apparatus according to a third embodiment of the present invention.

FIG. 5 is a timing diagram illustrating a method of driving a solid-state imaging apparatus according to the third embodiment of the present invention. The equivalent circuit of a pixel and the block diagram of the solid-state imaging apparatus are the same as those of the first and second embodiments. The present embodiment differs from the second embodiment in that a time period t1' exists between the sampling and holding of the reset outputs (t8) and the sampling and holding of the signal outputs (t10), and a horizontal scanning period Hscan(n: 1, n: 2). The time period t1' is a time period during which the signals Res(n), Res(n+1), Res(n+2), . . . are changed to the high level all together to reset each of the FD portions 105 to the low potential. It is necessary to set the power source voltage Vr to the low potential in order to reset the FD portions 105 to the low potential. At time t1', the amplifying MOS transistors 106 addressed by the signal Res (n+1) are in the non-activation states similarly to the amplifying MOS transistors 106 in the other rows. In the present embodiment, the amplifying MOS transistors 106 addressed by the signal Res(n+1) are activated at time t3' just after the time t1'. The amplifying MOS transistors 106 are in their activation states including the horizontal scanning period Hscan(n; 1, n; 2), following which the signal charges transferred by signals Tx1(n+1) and Tx2(n+1) are sequentially read out. In the present embodiment, a sufficiently long activation period can be provided to the amplifying MOS transistors 106 for the readouts by both the signals Tx1(n+1) and Tx2(n+1). To put it concretely, the time period from the activation of the amplifying MOS transistors 106 to the readouts is a time period t3'-t14 to the readouts of the noise outputs corresponding to the signal Tx1(n+1) or a time period t3'-t16 to the readouts of the signal outputs. And the time period to the readouts of the noise outputs corresponding to the signal Tx2(n+1) is a time period t3'-t18 or a time period t3'-t20 to the readouts of the signal outputs.

As described above, the third embodiment of the present invention can reduce the pseudo signals to both of the readouts corresponding to the signal charge quantities transferred by the signals Tx1(n) and Tx2(n). Consequently, the improvement effect to the problem is more remarkable, and further the following advantages can be obtained.

When the conventional pixel sharing technique is used, the time period from the time when a bias variation of an amplifying MOS transistor arises to the time when the correlated double sampling is performed differs in each pixel, and the problem in which the magnitude of the pseudo signal periodically varies is caused. This periodical variation causes the problem of the occurrence of a false color in a single chip color solid-state imaging apparatus.

The third embodiment of the present invention can reduce the variations of a periodical pseudo signal while suppressing the occurrence of the pseudo signal originated from an amplifying MOS transistor and can provide a solid-state imaging apparatus having excellent color reproducibility even in a solid-state imaging apparatus sharing pixels.

Fourth Embodiment

Figure 6:
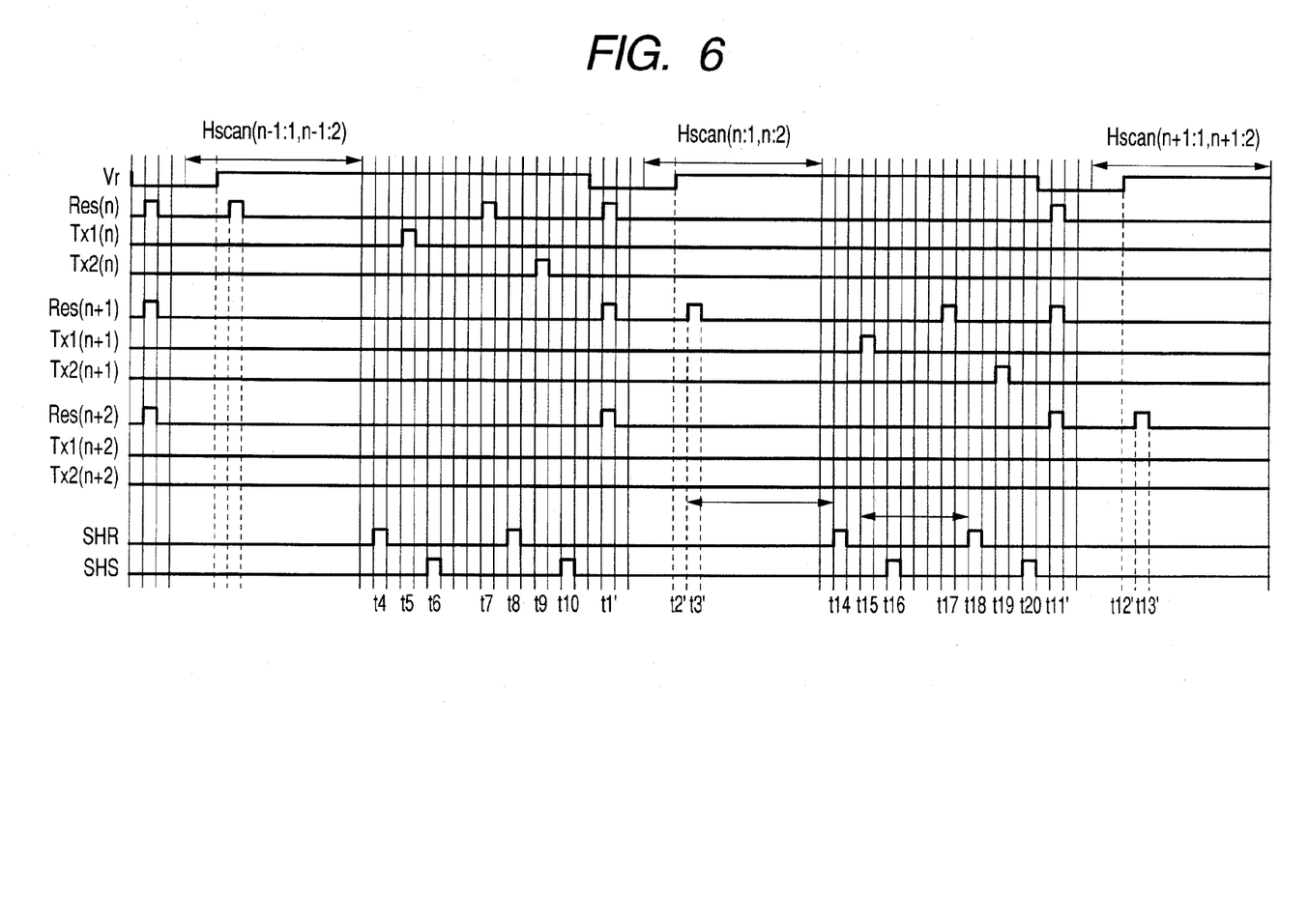
FIG. 6 is a timing diagram illustrating a method of driving a solid-state imaging apparatus according to a fourth embodiment of the present invention.

FIG. 6 is a timing diagram illustrating a method of driving a solid-state imaging apparatus according to the fourth embodiment of the present invention. The equivalent circuit of a pixel and the block diagram of the solid-state imaging apparatus are the same as those of the first and third embodiments. The present embodiment differs from the third embodiment in that the time period t1' in which the signal Res(n+1) is set to the high level to reset the FD portions 105 to the low potential is provided in the time period of the horizontal scanning period Hscan(n: 1, n: 2). In the present embodiment, the time period from the activation of the amplifying MOS transistors 106 to their readouts is a time period t3'-t14 to the readouts of the noise outputs corresponding to the signal Tx1($n$+1) or a time period t3'-t16 to the readouts of the signal outputs. And the time period is a time period t3'-t18 to the readouts of the noise outputs corresponding to the signal Tx2($n$+1) or the time period t3'-t20 to the readouts of the signal outputs.

Furthermore, the present embodiment can obtain a new advantage in addition to the advantage of the third embodiment. According to the study of the present inventor, the following matter is ascertained. By switching on and off a MOS transistor described in the Japanese Patent Application Laid-Open No. 2003-032554, the characteristic of the MOS transistor varies. Furthermore, it was ascertained that the MOS transistor characteristic varied by being influenced by a gate bias variation even if the variation of the gate bias was not so large that the on/off state of the MOS transistor was switched. At time t15 in FIG. 6 illustrating the drive timing, variations arise in the gate biases of the amplifying MOS transistors 106, which are maintaining their activation states. The variations of the MOS transistor characteristics caused by the gate bias variations arise, although the variations are small. To put it more concretely, when the transfer switches (transfer MOS transistors) 103 or 104 are turned on, the electric charges existing under the channels of the amplifying MOS transistors 106 decrease, and floating states are transiently caused. Consequently the characteristics of the amplifying MOS transistors 106 vary by the operations at the time t15.

On the other hand, at time t17, the gate potential of the amplifying MOS transistors 106 is reset, but the gate potential varies to the high potential to the amplifying MOS transistors 106, which are already in their activation states, here. Consequently, different from the phenomenon at the time t15, the variations of the potential at the time t17 does not exert so much influences to the signals subjected to sampling and holding. Incidentally, although the electric charges accumulated in each photoelectric conversion element are described as electrons here, similar discussions can be applied to a case where the electric charges accumulated in each photoelectric conversion element are holes.

The present embodiment enables the alignment of the quantities of variations of the characteristics of the amplifying MOS transistors 106, which arise at the time of the readouts performed by the signal Tx1($n$+1) and at the time of the readouts performed by the signal Tx2($n$+1), to be equal by adjusting the time t3'. That is, even in a solid-state imaging apparatus sharing pixels with some residual characteristic variations of the amplifying MOS transistors 106, the solid-state imaging apparatus having excellent color reproducibility with reduced variations of periodical pseudo signals can be provided. Consequently, also in the solid-state imaging apparatus sharing pixels, with an improvement effect similar to or greater than that of the third embodiment, the solid-state imaging apparatus having excellent color reproducibility with reduction of the variations of periodical pseudo signals can be provided.

Furthermore, in the present embodiment, the following advantage can be obtained in addition. A CMOS sensor is provided with a constant current source in each column in order to drive the amplifying MOS transistor in each pixel. That is, at the time of setting the amplifying MOS transistors in their driving states, the constant current sources for the number of columns make currents flow, and large power consumption is needed. In the present embodiment, the power source voltages Vr are not required to be always at the high level during a horizontal scanning period. Consequently, no currents flow through the amplifying MOS transistors 106 or the current can be remarkably reduced during the time periods in which the power source voltages Vr are at the low level. Consequently, in the present embodiment, the consumption currents by the constant current sources can be greatly reduced. Consequently, the power consumption of the solid-state imaging apparatus can be reduced by the present embodiment.

Fifth Embodiment

The examples of sharing a pixel circuit by the two photoelectric conversion elements 101 and 102 have been described in the first to fourth embodiments of the present invention. The present invention is not restricted to the aforesaid equivalent circuits, but further larger advantages can be obtained in the case where three or more photoelectric conversion elements share a pixel circuit. For example, if four photoelectric conversion elements share a pixel circuit as illustrated in FIG. 1 of the Japanese Patent Application Laid-Open No. 2005-198001, it is possible to lengthen the time periods during which the amplifying MOS transistors are activated by the similar concept to those of the first to fourth embodiments.

Figure 8:
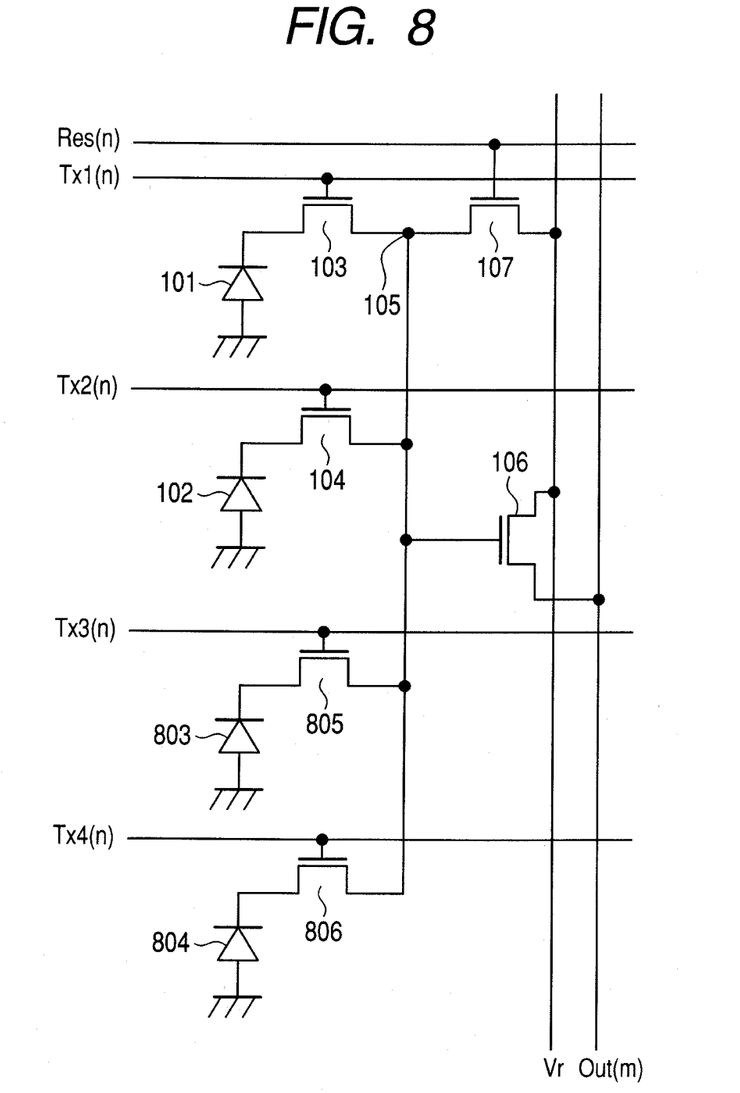
FIG. 8 is an equivalent circuit diagram of a pixel according to the fifth embodiment of the present invention.

FIG. 8 is an equivalent circuit diagram of a pixel according to the fifth embodiment of the present invention. The pixel includes photoelectric conversion elements 101, 102, 803, and 804, which are connected to an FD portion 105 through transfer switches 103, 104, 805, and 806, respectively. The FD portion 105 is actually a node formed of the gate capacity of the amplifying MOS transistor 106, the source capacity of the reset MOS transistor 107, the drain capacities of the transfer switches 103, 104, 805, and 806, and the parasitic capacitance of the wiring mutually connecting the aforesaid capacities. The gates of the transfer switches 103, 104, 805, and 806 are controlled by signals Tx1($n$), Tx2($n$), Tx3($n$), and Tx4($n$), respectively. The gate of the reset MOS transistor 107 is controlled by the signal Res(n). Here n indicates an address of the row of the pixel. The drain of the amplifying MOS transistor 106 and the drain of the reset MOS transistor 107 are connected to the power source voltage Vr. The power source voltage Vr is a variable source voltage, and can provide different electric potentials at different time. The source of the amplifying MOS transistor 106 is connected to the vertical signal line Out(m). Here m indicates the address of the column of the pixel. The vertical signal line Out(m) is provided with the not shown sampling and holding circuit, and a signal output to the vertical signal line Out(m) can be held.

Figure 7:
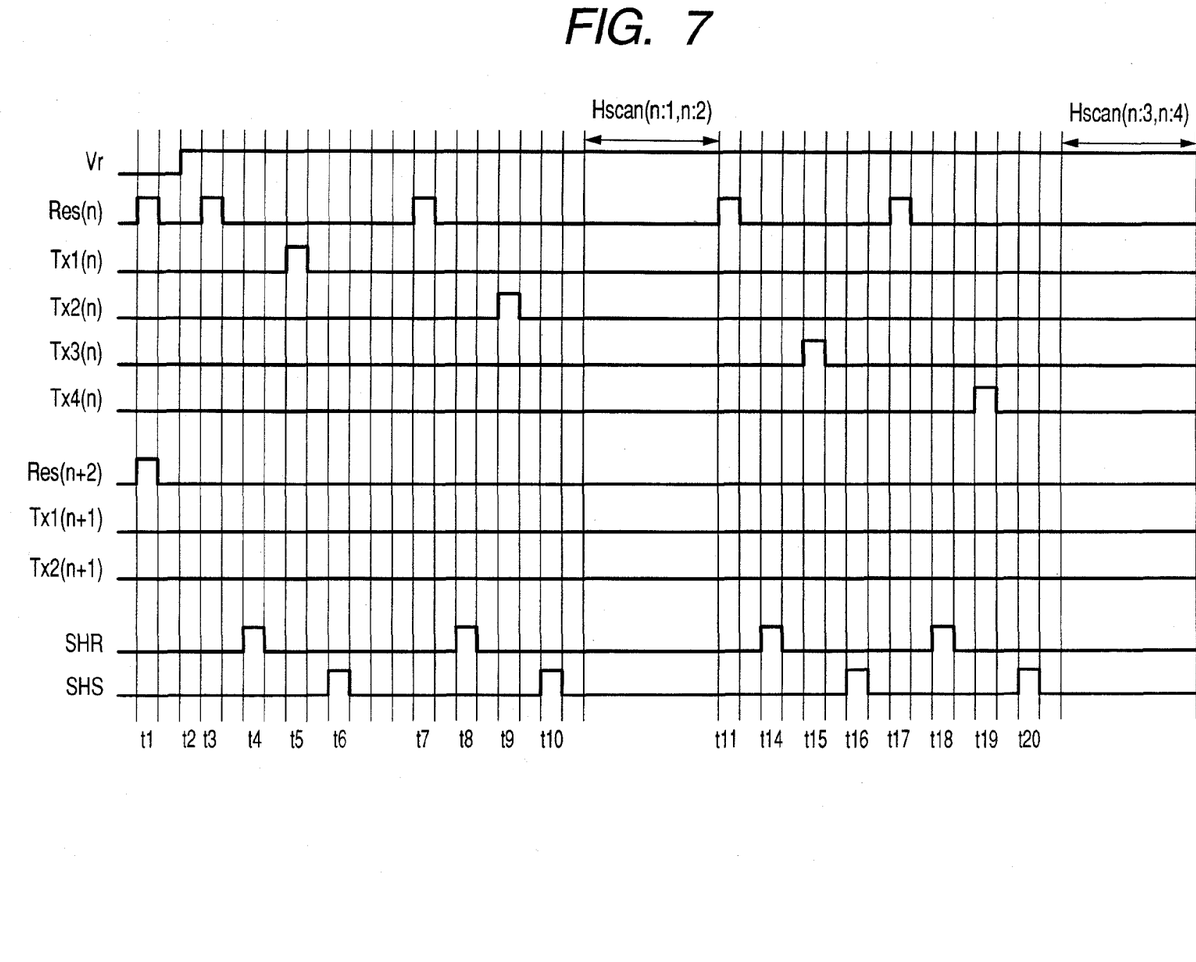
FIG. 7 is a timing diagram illustrating a method of driving a solid-state imaging apparatus according to a fifth embodiment of the present invention.

FIG. 7 is a timing diagram illustrating a method of driving a solid-state imaging apparatus according to the fifth embodiment of the present invention. The timing diagram of FIG. 7 illustrates pulses Tx1(n), Tx2(n), Tx3(n), and Tx4(n) to be applied to the gates of the transfer switches 103, 104, 805, and 806, respectively, corresponding to the four photoelectric conversion elements 101, 102, 803, and 804, respectively. In the present embodiment, the non-activation of the amplifying MOS transistors 106 is performed at the time t1, and the amplifying MOS transistors 106 of a selected row are activated at the time t2. After that, the amplifying MOS transistors 106 maintain their activation states until the readouts of the electric charges transferred by the signals Tx1(n)-Tx4(n) are performed.

Incidentally, although the horizontal scanning of the signals for four rows is performed by dividing the horizontal scanning into two times of the horizontal scanning periods Hscan(n: 1, n: 2) and Hscan(n: 3, n: 4) in FIG. 7, it can be performed by a single horizontal scanning if a line memory for holding the signals for four rows is provided.

The advantage of the present invention can be obtained especially in the readout of the photoelectric conversion element that is read out secondarily between the two photoelectric conversion elements connected to one amplifying MOS transistor in the first embodiment. As illustrated in the present embodiment, in the case where four photoelectric conversion elements share one amplifying MOS transistor, the advantage of the present invention can be obtained in the readouts of three out of four photoelectric conversion elements sharing pixel circuitry.

In the present embodiment, an example of applying the drive method of the first embodiment to the case of sharing the one amplifying MOS transistor 106 by four photoelectric conversion elements 101, 102, 803, and 804, and the drive methods of the second to fourth embodiments can be extended to the drive of the case of sharing one amplifying MOS transistor by four or more photoelectric conversion elements.

As described above, the fifth embodiment of the present invention can realize the solid-state imaging apparatus including less fixed pattern noises and shading by suppressing the occurrence of pseudo signals in amplifying MOS transistors. Furthermore, since the fifth embodiment can suppress the problems that the magnitudes of the pseudo signals vary periodically, the fifth embodiment enables the realization of an excellent color reproducibility especially in a single chip color solid-state imaging apparatus. In addition, the fifth embodiment can reduce the power consumption of constant current sources, and consequently the fifth embodiment can provide a low power consumption solid-state imaging apparatus.

As described above, the solid-state imaging apparatus of the first to fifth embodiments severally include the imaging region 201, the vertical scanning circuit 202, and the horizontal scanning circuit 203. The imaging region 201 two-dimensionally arranges the plurality of pixel circuits each including the plurality of photoelectric conversion elements 101 and 102, the single floating diffusion portion 105, the plurality of transfer switches 103 and 104, the amplifying transistor 106, and the reset transistor 107. The plurality of photoelectric conversion elements 101 and 102 generates electric charges by photoelectric conversion and accumulates the generated electric charges. The single floating diffusion portion 105 accumulates electric charges. The plurality of transfer switches 103 and 104 transfer the electric charges accumulated in the plurality of photoelectric conversion elements 101 and 102 to the single floating diffusion portion 105, respectively. The amplifying transistor 106 amplifies the voltage corresponding to the electric charges accumulated in the floating diffusion portion 105. The reset transistor 107 resets the voltage of the floating diffusion portion 105. The vertical scanning circuit 202 controls the transfer switches 103 and 104 and the reset transistor 107. The horizontal scanning circuit 203 sequentially transfers the voltage amplified by the amplifying transistor 106 to the outside. A power source circuit sets the power source voltage Vr to be supplied to the amplifying transistor 106 to the high level, and thereby setting the amplifying transistor 106 to be in its activation state. The power source circuit sets the power source voltage Vr to be supplied to the amplifying transistor 106 to the low level, and thereby setting the amplifying transistor 106 to be in its non-activation state. The power source circuit may be provided in the horizontal scanning circuit 203, or may be provided in the vertical scanning circuit 202 or in the imaging region 201. While each of the aforesaid embodiments is maintaining the activation state of the amplifying transistor, the embodiment sequentially transfers the electric charges of the plurality of photoelectric conversion elements to the floating diffusion portion with the plurality of transfer switches, and sequentially reads the voltage according to the electric charges of the plurality of photoelectric conversion elements with the horizontal scanning circuit.

In FIGS. 3, 5, 6, and 7, the time period during which the activation state of the amplifying transistor 106 is maintained includes at least a part of the horizontal scanning period Hscan.

The solid-state imaging apparatus performs the correlated double sampling. In the state in which the voltage of the floating diffusion portion 105 is reset, the amplifying transistor 106 outputs the reset output voltage. Moreover, in the state in which the electric charges of the photoelectric conversion elements 101 and 102 are transferred to the floating diffusion portion 105, the amplifying transistor 106 outputs a signal output voltage. The horizontal scanning circuit 203 outputs the difference between the reset output voltage and the signal output voltage.

In FIG. 6, after the amplifying transistor 106 has been set in the activation state, the length of the time period from the time t3' to the time t14 and the length of the time period from the time t15 to the time t18 are the same lengths. Here, the same lengths do not mean that both the lengths are exactly the same, but some differences can be allowed. The time period from the time t3' to the time t14 is the time period from the resetting of the floating diffusion portion 105 to the sampling and holding of the reset output voltage of the first photoelectric conversion element among the plurality of photoelectric conversion elements. The time period from the time t15 to the time t18 is the time period from the transfer of the electric charges of the first photoelectric conversion element among the plurality of photoelectric conversion elements to the sampling and holding of the reset output voltage of the second photoelectric conversion element.

Now, in a solid-state imaging apparatus having the pixel configuration in which a plurality of photoelectric conversion elements shares a single floating diffusion portion, it is possible to add the electric charges accumulated in the plurality of photoelectric conversion elements at the floating diffusion portion. The present invention can also be applied to such a case. all of the electric charges to be added from the photoelectric conversion elements may be transferred to the floating diffusion portion, and the electric charges may be sampled and held by the sampling and holding circuit, followed by the reset of the floating diffusion portion.

Incidentally, any of the embodiments shows only the concrete examples of the implementation of the present invention, and the scope and sprit of the present invention should not be interpreted to be limited to those embodiments. That is, the present invention can be implemented in various forms without departing from its sprit and principal features.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-035222, filed Feb. 15, 2008, which is hereby incorporated by reference herein its entirety.

What is claimed is:

1. A solid-state imaging apparatus comprising:
an imaging area wherein a plurality of pixel circuits are arranged two dimensionally, each of the pixel circuits including:
a plurality of photoelectric conversion elements each for generating an electric charge by photoelectric conversion,
an amplifying transistor for amplifying a voltage corresponding to the electric potential of a control electrode of the amplifying transistor, and
a plurality of transfer switches each for transferring the electric charge from one of the plurality of photoelectric conversion elements to the control electrode;
the solid-state imaging apparatus further comprising
a vertical scanning circuit for controlling the plurality of transfer switches;
a horizontal scanning circuit for reading out a signal based on the voltage amplified by the amplifying transistor; and
a power source circuit for controlling a voltage supplied to the amplifying transistor to set the amplifying transistor to an activation state or a non-activation state,
wherein the plurality of transfer switches transfer the electric charges from the plurality of photoelectric conversion elements sequentially to the control electrode while maintaining the amplifying transistor in the activation state, the horizontal scanning circuit sequentially reads out the voltages corresponding to the electric charges of the plurality of photoelectric conversion elements in one row of the plurality of pixel circuits, and a time period of maintaining the amplifying transistor in another row of the plurality of pixel circuits in the activation state includes at least a part of a horizontal scanning period of the one row of the plurality of pixel circuits, such that, during the horizontal scanning period for reading out the signals from the one row of the plurality of pixel circuits, the amplifying transistor of one of the plurality of pixel circuits in the another row is in the activation state.

2. The solid-state imaging apparatus according to claim 1, wherein the horizontal scanning circuit outputs a difference between a reset output voltage output by the amplifying transistor after a voltage of the control electrode is reset and a signal output voltage output by the amplifying transistor in a state that the signal charge of one of the photoelectric conversion elements is transferred to the control electrode, and
wherein under a condition of the activation of the amplifying transistor, a time period from the reset of the voltage of the control electrode until a sampling and holding of the reset output voltage of a first one among the plurality of the photoelectric conversion elements is the same length as a time period from a transfer of the electric charge of the first one of the plurality of photoelectric conversion elements until a sampling and holding of the reset output voltage of a second one of the plurality of photoelectric conversion elements.

3. The solid-state imaging apparatus according to claim 1, wherein each of the pixel circuits further includes a reset transistor for resetting the voltage of the control electrode, and
wherein a floating diffusion portion is reset after transferring the electric charges from the plurality of photoelectric conversion elements to the control electrode and after sampling and holding the output voltage based on the amplification of the voltage corresponding to the electric charges transferred to the control electrode.

4. The solid-state imaging apparatus according to claim 1, further comprising
a plurality of sampling and holding circuits each for holding the voltage amplified by the amplifying transistor, to provide the signal read out by the horizontal scanning circuit.

5. A method of driving a solid-state imaging apparatus comprising an imaging area wherein a plurality of pixel circuits are arranged two dimensionally, and each of the pixel circuits includes a plurality of photoelectric conversion elements each for generating an electric charge by photoelectric conversion, an amplifying transistor for amplifying a voltage corresponding to the electric potential of a control electrode of the amplifying transistor, and a plurality of transfer switches each for transferring the electric charge from one of the plurality of photoelectric conversion elements to the control electrode, the solid-state imaging apparatus further comprising a power source circuit for controlling a voltage supplied to the amplifying transistor to set the amplifying transistor to an activation state or a non-activation state, the method comprising steps of:
transferring, by the plurality of transfer switches, the electric charges from the plurality of photoelectric conversion elements sequentially to the control electrode while maintaining the amplifying transistor in the activation state; and
sequentially reading out the voltages corresponding to the electric charges of the plurality of photoelectric conversion elements in one row of the plurality of pixel circuits,
wherein a time period of maintaining the amplifying transistor in another row of the plurality of pixel circuits in the activation state includes at least a part of a horizontal scanning period of the one row of the plurality of pixel circuits, such that, during the horizontal scanning period for reading out the signals from the one row of the plurality of pixel circuits, the amplifying transistor of one of the plurality of pixel circuits in the another row is in the activation state.

6. The method according to claim 5, further comprising a step of holding the voltage amplified by the amplifying transistor with a plurality of sampling and holding circuits, to provide the signal read out by the horizontal scanning circuit.

7. A solid-state imaging apparatus comprising:
a plurality of pixel circuits arranged in a plurality of columns, each of the pixel circuits including:
a plurality of photoelectric conversion elements each for generating an electric charge by photoelectric conversion,
an amplifying transistor for amplifying a voltage corresponding to the electric potential of a control electrode of the amplifying transistor, and
a plurality of transfer switches each for transferring the electric charge from one of the plurality of photoelectric conversion elements to the control electrode;

a plurality of sampling and holding circuits each for holding a signal derived from the amplifying transistor; and a power source circuit for controlling a voltage supplied to the amplifying transistor to set the amplifying transistor to an activation state or a non-activation state, wherein the plurality of transfer switches transfer the electric charges from the plurality of photoelectric conversion elements sequentially to the control electrode while maintaining the amplifying transistor in the activation state, and the signals derived based on the electric charges from one row of the plurality of pixel circuits and held by the sampling and holding circuits are sequentially read out, and wherein a time period of maintaining the amplifying transistor in another row of the plurality of pixel circuits in the activation state includes at least a part of a read-out time of the signals derived based on the electric charges from the one row of the plurality of pixel circuits through the sampling and holding circuits, such that, during the horizontal scanning period for reading out the signals derived based on the electric charges from the one row of the plurality of pixel circuits, the amplifying transistor of one of the plurality of pixel circuits in the another row is in the activation state.

* * * * *